United States Patent
Vuillemin

(10) Patent No.: US 9,361,876 B2
(45) Date of Patent: Jun. 7, 2016

(54) METHOD OF PROCESSING ACOUSTIC WAVES EMITTED AT THE OUTLET OF A TURBO ENGINE OF AN AIRCRAFT WITH A DIELECTRIC-BARRIER DISCHARGE DEVICE AND AIRCRAFT COMPRISING SUCH A DEVICE

(75) Inventor: Alexandre Alfred Gaston Vuillemin, Fontainebleau (FR)

(73) Assignee: SNECMA, Paris (FR)

( * ) Notice: Subject to any disclaimer, the term of this patent is extended or adjusted under 35 U.S.C. 154(b) by 108 days.

(21) Appl. No.: 13/643,382

(22) PCT Filed: Apr. 18, 2011

(86) PCT No.: PCT/FR2011/050886
§ 371 (c)(1),
(2), (4) Date: Oct. 25, 2012

(87) PCT Pub. No.: WO2011/135229
PCT Pub. Date: Nov. 3, 2011

(65) Prior Publication Data
US 2013/0043343 A1    Feb. 21, 2013

(30) Foreign Application Priority Data
Apr. 27, 2010    (FR) ...................... 10 53221

(51) Int. Cl.
*B64C 23/00*    (2006.01)
*G10K 11/178*    (2006.01)
(Continued)

(52) U.S. Cl.
CPC .............. *G10K 11/1788* (2013.01); *B64C 1/40* (2013.01); *B64C 7/02* (2013.01); *B64C 23/005* (2013.01); *B64D 33/06* (2013.01); *B64C 2220/00* (2013.01); *B64C 2230/12* (2013.01); *B64C 2230/14* (2013.01); *B64D 2033/0206* (2013.01); *B64D 2033/0286* (2013.01)

(58) Field of Classification Search
CPC .. B64C 23/00; B64C 23/005; B64C 2230/02; B64C 2230/12; B64C 2230/14; B64D 33/06; B64D 2033/0206; F02K 1/34; G10K 15/06; G10K 2210/1281; H05H 1/2406; H05H 2001/2412; H05H 2001/2418; H05H 2001/2425
USPC ........... 244/205, 204, 204.1, 200, 200.1, 1 N, 244/130; 181/210, 211, 206
See application file for complete search history.

(56) References Cited

U.S. PATENT DOCUMENTS 3,685,610 A    8/1972    Bschorr
3,826,331 A *   7/1974    Scharton et al. .............. 244/1 N
(Continued)

OTHER PUBLICATIONS

Bastien., F., "Acoustics and gas discharges: applications to loudspeakers," J. Phys. D: Appl. Phys., vol. 20, No. 12, pp. 1547-1557, XP 002613460, (Dec. 14, 1987).
(Continued)

*Primary Examiner* — Tien Dinh
*Assistant Examiner* — Riachrd R Green
(74) *Attorney, Agent, or Firm* — Oblon, McClelland, Maier & Neustadt, L.L.P

(57) ABSTRACT

A method of processing acoustic waves emitted at an outlet of a turbo engine of an aircraft with a dielectric barrier discharge device, and an aircraft including such a device. The method includes activating the dielectric barrier discharge device so as to emit an electric wind in a direction of acoustic waves so as to attenuate the acoustic waves. An aircraft can include such a dielectric barrier discharge device.

8 Claims, 2 Drawing Sheets

(51) Int. Cl.
    *F02K 1/34*     (2006.01)
    *B64C 1/40*     (2006.01)
    *B64C 7/02*     (2006.01)
    *B64D 33/02*     (2006.01)

(56) References Cited

U.S. PATENT DOCUMENTS

| | | | | |
|---|---|---|---|---|
| 5,167,383 | A | * | 12/1992 | Nozaki ............ 244/207 |
| 5,919,029 | A | | 7/1999 | Van Nostrand et al. |
| 5,966,452 | A | * | 10/1999 | Norris ............ 381/71.1 |
| 7,380,756 | B1 | * | 6/2008 | Enloe et al. ............ 244/130 |
| 7,624,941 | B1 | * | 12/2009 | Patel et al. ............ 244/200.1 |
| 7,686,256 | B2 | * | 3/2010 | Miller et al. ............ 244/200.1 |
| 8,091,950 | B2 | * | 1/2012 | Corke et al. ............ 296/180.1 |
| 8,453,457 | B2 | * | 6/2013 | Ginn et al. ............ 313/607 |
| 2007/0107414 | A1 | * | 5/2007 | Papamoschou ........ F02K 1/383 60/204 |
| 2008/0067283 | A1 | * | 3/2008 | Thomas ............ 244/1 N |

OTHER PUBLICATIONS

International Search Report Issued Aug. 31, 2011 in PCT/FR11/050886 Filed Apr. 18, 2011.

\* cited by examiner

METHOD OF PROCESSING ACOUSTIC WAVES EMITTED AT THE OUTLET OF A TURBO ENGINE OF AN AIRCRAFT WITH A DIELECTRIC-BARRIER DISCHARGE DEVICE AND AIRCRAFT COMPRISING SUCH A DEVICE

BACKGROUND OF THE INVENTION

1. Field of the Invention

The field of the present invention is civil aeronautics and, in particular, noise generation from aircraft.

2. Description of the Related Art

Noise generated by civil airplanes, in particular upon takeoff, is a largely known nuisance and numerous innovations have been imagined to try and reduce it. One of the main sources of such a noise lies in the jet of the engines which are used at full power upon takeoff phase. Important works have been obviously conducted to try and reduce noise from jet engines, such as for example sawtooth-shaped herringbones for the ejection nozzle, either for the hot gas one, coming from the primary flow of the jet engine, or for the nozzle of the so-called cold gas which are coming from the secondary flow of the engine.

In order to limit the nuisances to which people living near the airports are submitted strict standards have been imposed, limiting the noise that can be perceived in various points located around the airplane, at different distances and in several directions with respect to the runway.

One of the particularly critical points to be respected by the designers of airplanes in terms of allowable maximal noise to obtain the certification for an airplane is located in a lateral position with respect to the airplane, at a distance of 450 m of the takeoff runway. The presence of the pylon, that is to say the mast supporting the engine by connecting it to the wing, locally generates at the level of the gas ejection, high turbulence levels in the flow, with as a consequence a very significant increase of the lateral noise of the engine. Such phenomenon is particularly acute for configurations where the pylon is prominent beyond the gas ejection plane, this becoming a very frequent configuration on the recent civil airplanes.

The results of numerical calculations or measurements implemented on a mock up in a wind tunnel, show quite well that the effects of interactions between the flow circulating along the pylon and the pylon itself generate a strong increase of the turbulence levels and, consequently, of the noise level. An important modification of the jet angular development radially around the pylon can also be noticed, thereby tending to orient the engine jet around the pylon along the direction of the wing.

Furthermore, the experience acquired shows that the introduction of the pylon, besides its influence on the increase of the sound level on a conventional ejection configuration, can also reduce considerably the efficiency of other devices being arranged to reduce the exhaust gas noise, such as herringbones or mixers arranged on the nozzles.

The presence of the pylon introduces in such a way, in terms of acoustics, an increase of the ejection noise on the lateral point of certification, which can vary between 2 to 3.5 EPNdB (Effective Perceived Noise in Decibels) according to the motive cycle, the pylon size and the ejection geometries being considered. The turbulences form small swirling structures which enlarge and radiate outside the turbo engine at low frequency and generate noise.

The need to reduce the jet noise being a constant preoccupation of the motorists, anybody sees quite well the interest to reduce noise at the source, i.e. by acting on the local turbulent flows around the pylon. The noise reduction potential seems to be even, finally, more important that the one brought by the implementation of herringbones of micro-jets on the periphery of the nozzle.

BRIEF SUMMARY OF THE INVENTION

In order to eliminate at least some of such drawbacks, the invention relates to a method of processing acoustic waves emitted at the outlet of a turbo engine of an aircraft, the aircraft comprising a dielectric barrier discharge device, in which method said device is activated to emit an electric wind in the direction of the acoustic waves in such a way to attenuate them.

Thanks to the method according to the invention, the emission of the electric wind is monitored through the dielectric barrier discharge device. The electric wind being emitted interacts with the acoustic waves of the engine, which has as an effect to attenuate them. A dielectric barrier discharge device has the advantage to be able to be controlled actively to regulate the noise from the turbo engine, the device being switched on upon takeoff and switched off in flight.

By nature, the activation of the dielectric barrier discharge device leads to an ambient air ionization and induces, due to Coulomb force, a flow by a movement quantity transfer. Such a flow is known under the name of electric wind.

The electric wind interacts with the turbulent structures formed by the acoustic waves in contact with the aircraft, the electric wind preventing the turbulence structures to enlarge and generate low frequency noise, being characteristic of jet noise.

For an engine mounted on a wing via a pylon, the dielectric barrier discharge device improves the ejection flow shearing layer coming in contact with the pylon while attenuating the amplitude of the acoustic waves emitted by the turbo engine.

The invention also relates to an aircraft comprising at least a turbo engine emitting at the outlet acoustic waves and a dielectric barrier discharge device with such a configuration to emit an electric wind in the direction of the acoustic waves so as to attenuate them.

Preferably, the dielectric barrier discharge device is actually positioned downstream from the turbo engine. This allows advantageously the acoustic waves coming from the engine to be directly attenuated.

Still preferably, the turbo engine comprising a primary ejection section and a secondary ejection section, the electric barrier discharge device is actually positioned downstream from the secondary ejection section. The acoustic waves related to the pylon are then strongly attenuated.

Preferably, the dielectric barrier discharge device comprises a first high tension electrode and a second electrode connected to the ground which are separated by a dielectric medium.

According to one aspect of the invention, the aircraft comprising at least one wing, the dielectric barrier discharge device is mounted on said wing. Thus, the device allows the acoustic waves of turbo engine being arranged on said wing to be attenuated. The attenuation being implemented at proximity of the noise source, the noise reduction is important. Preferably, the device is integrated downstream from the engine.

Preferably, the wing comprising a higher surface and a lower surface, the wing comprising a fastening means connecting the is turbo engine to said wing, being located on one of said surfaces, the dielectric barrier discharge device is mounted on the surface of the wing where the fastening means are located. The dielectric barrier discharge device is mounted facing the turbo engine, thereby allowing the acoustic waves to be directly attenuated, in the vicinity of the noise source. When the acoustic waves emitted by the engine contact the surface of the wing, the dielectric barrier discharge device emits an electric wind, which attenuates the amplitude of said acoustic waves.

Still preferably, the dielectric barrier discharge device is integrated into said wing so that the external surface of the wing is continuous. Advantageously, the integration of the dielectric barrier discharge device does not modify the dimensions of the wing, which thus keeps its aerodynamic properties.

According to another aspect of the invention, the aircraft comprising at least one wing and a pylon connecting the turbo engine to said wing, the dielectric barrier discharge device is mounted on said pylon.

BRIEF DESCRIPTION OF THE SEVERAL VIEWS OF THE DRAWINGS

Other characteristics and advantages of the invention will appear in the following description being made with respect to the accompanying figures given as non limitative examples.

DETAILED DESCRIPTION OF THE INVENTION

Figure 1:
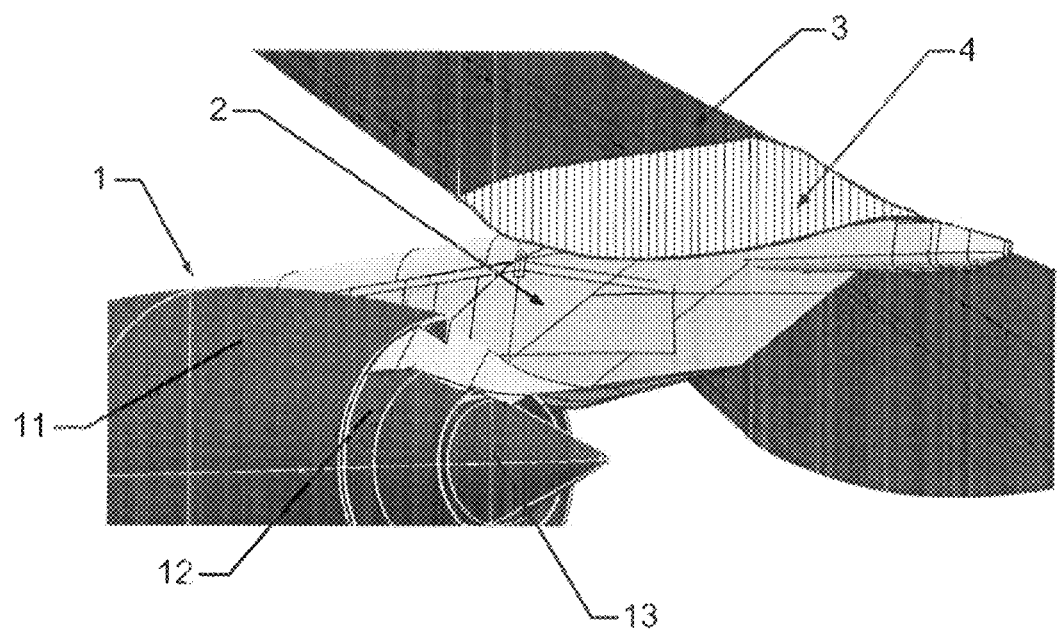
FIG. 1 is a schematic perspective representation of an aircraft according to the invention, wherein the electric barrier discharge device is integrated into the lower surface of the wing.

A double flow turbo engine 1 in which a primary airflow, or hot flow, and a secondary flow, or cold flow, are discharged at the outlet of the turbo engine, is represented referring to FIG. 1. In particular, the turbo engine 1 comprises an external cowling for the secondary flow 11 stream, an external cowling of the primary flow 12 stream and a discharge cone 13. The latter delimits with the external cowling of the primary flow 12 stream the primary flow nozzle. The secondary flow nozzle is arranged between the external cowling of the secondary flow 11 stream and the external cowling of the primary flow 12 stream and opens into the secondary nozzle.

The turbo engine 1 is made integral with a wing 3 of an aircraft through a support pylon 2 for the turbo engine 1 which is here of a monobloc type. Referring to FIG. 1, such pylon extends longitudinally from upwards to downwards according the axis of the turbo engine and comprises a higher part for fastening to the wing 3 of the aircraft and a lower part for fastening to the turbo engine 1, said part for fastening to the aircraft being downwards from the part for fastening to the turbo engine.

As represented on FIG. 1, the turbo engine 1 is mounted upwards from the wing 3 of the aircraft, the lower surface of the upward part of the pylon 2 comprises fastening means for the turbo engine, of the fitting and rod type, being known from the man of the art. On the same way, the higher surface of the downstream part of the pylon 2 comprises fastening means for the wing 3 of the fitting and rod type, being known from the man of the art.

According to the invention, the wing 3 of the aircraft comprises a dielectric barrier discharge device 4 with such a configuration as to emit an electric wind so as to attenuate the acoustic waves.

Figure 2:
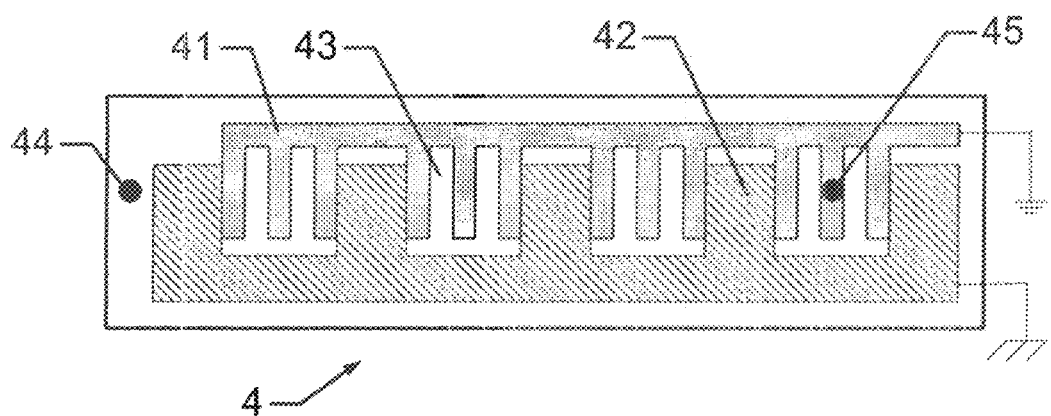
FIG. 2 is a schematic sectional view of a dielectric barrier discharge device according the invention.

As an example, referring to FIG. 2, the dielectric barrier discharge device 4 is globally designed under the form of a rectangular so plate comprising a first high tension electrode 41 and a second electrode 42, connected here to the ground, which are separated by a dielectric medium 43 to generate a discharge ionizing the ambient air at the surface of the device 4. Such air ionization, due to Coulomb force, induces a flow called electric wind by a movement quantity transfer. The dielectric barrier discharge device 4 allows the flow to be checked around an aerodynamic profile. The dielectric barrier discharge device 4 is also called a plasma actuating device.

The dielectric barrier discharge device 4 is supplied by a current, the intensity of which is variable. While controlling the characteristic of the supplying current (pulsations, amplitude, etc.), the characteristics of the electric wind emitted by the dielectric barrier discharge device 4 are controlled. The electric wind allows the flow in the vicinity of the device to be modified so as to favor either the separation process, or the re-attachment process of the limit layer. Thus, the electric wind interacts with the turbulent structures formed by the acoustic waves in contact with the pylon or an aircraft wing, the electric wind preventing the turbulent structures to enlarge and generate a low frequency noise, being characteristic of the jet noise.

Referring to FIG. 2, the dielectric barrier discharge device 4 further comprises pressure sensors 44, 45 adapted for measuring the flow pressure at the surface of the device 4. Thanks to the sensors 45, 46, the dielectric barrier discharge device 4 allows the formation of the electric wind (intensity, etc.) to be regulated as a function of the flow being measured. The re-attachment and separation process of the limit layer can be slaved as a function of the flow being measured.

Figure 3:
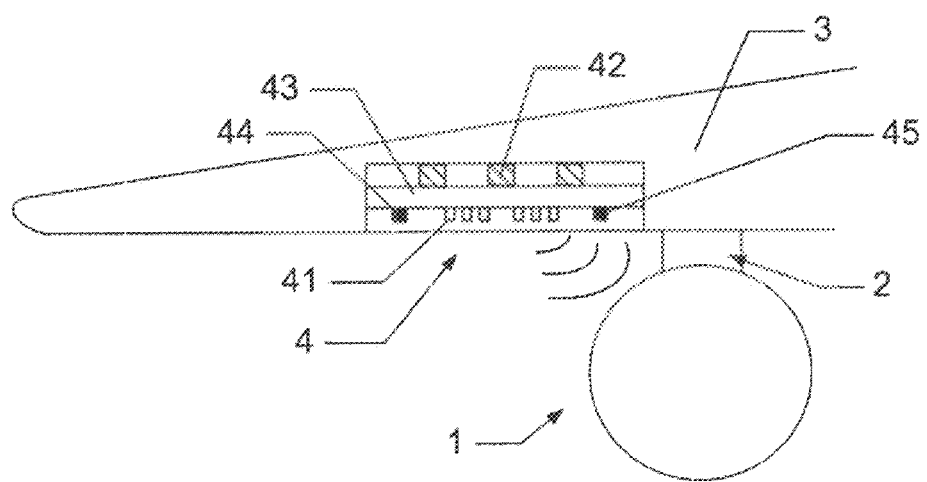
FIG. 3 is a schematic sectional view of one wing of an aircraft according to the invention, wherein a dielectric barrier discharge device is integrated into the lower surface of an aircraft wing.

Referring to FIGS. 1 and 3, the dielectric barrier discharge device 4 is integrated into the lower surface of the wing 3 of the aircraft so as to attenuate the acoustic waves emitted by the engine 1 mounted below the wing 3. The dielectric barrier discharge barrier 4 is here integrated into said wing 3 so that the external surface of the wing 3 is continuous. In other words, referring to FIG. 3, a cavity is provided in the so wing 3 so as to accommodate the dielectric barrier discharge device 4 so that the external surface of the device 4 is continuous with the external surface of the wing 3 so as to keep the aerodynamic properties of the wing 3.

The dielectric barrier discharge device 4 is in such example integrated into the wing 3, but it goes without saying that it could also be mounted on said wing 3.

The dielectric barrier discharge device 4 may comprise a plurality of electrodes 41, 42, the dimensions, the surface and the arrangement of which depend on the location of the device on the aircraft.

Also, the electric current applied to the dielectric barrier discharge device 4 may vary so as to form the desired electric wind.

According to a preferred embodiment, the dielectric barrier discharge device has such a configuration to emit electric winds which are out of phase with respect to each other so as to attenuate the acoustic waves on a broad band of frequencies.

While emitting electric winds, the formation of turbulences from the turbo engine which enlarge upon their circulation downwardly is limited. The aircraft is then efficiently protected against turbulences, an important source of noise being cancelled.

According to a non shown embodiment, the dielectric barrier discharge 4 is mounted on the pylon 2 of the aircraft so as to attenuate the acoustic waves coming from the engine. The influence of the pylon 2 on the noise being generated is then directly limited. The areas adapted to generate noise by interaction with the ejection flow of the turbo engine are thus protected on a localized way without affecting the aerodynamic performances of the engine. It goes without saying that the dielectric barrier discharge device 4 could be directly integrated into the pylon 2 so that the external surface of the pylon is continuous.

Preferably, the dielectric barrier discharge device 4 is switched on upon takeoff so as to attenuate the turbo engine noise so that the noise level emitted meets the current standards. Still preferably, to limit the power conception, the dielectric barrier discharge device 4 is switched off in flight, more particularly, in a cruising rate.

The invention claimed is:

1. A method of processing acoustic waves emitted at an outlet of a turbo engine of an aircraft, the aircraft comprising a wing provided with a lower surface, the turbo engine being fastened to said lower surface by fastening means, the aircraft including a dielectric barrier discharge device, the method comprising:
providing the dielectric barrier discharge device at the lower surface proximate to where the turbo engine is fastened, facing the turboengine, higher than and downstream of an upstream portion of a support pylon which is fastened to the turbo engine, the support pylon connecting the turbo engine to the wing;
activating the dielectric barrier discharge device upon takeoff to emit an electric wind in a direction of the acoustic waves so to attenuate the acoustic waves; and
deactivating the dielectric barrier discharge device in a cruising rate of flight of the aircraft.

2. The method according to claim 1, wherein the dielectric barrier discharge device is supplied by a current, and the dielectric barrier discharge device is controlled by at least one characteristic of the current so as to control at least one characteristic of the electric wind.

3. An aircraft comprising:
a turbo engine which emits acoustic waves at an outlet thereof;
a wing provided with a lower surface;
a support pylon which connects the turbo engine to said lower surface of the wing, an upstream portion of the support pylon being fastened to the turbo engine; and
a dielectric barrier discharge device provided at said lower surface proximate to where the turbo engine is connected, facing the turbo engine, so as to be disposed higher than and downstream of the upstream portion of the support pylon, the dielectric barrier discharge device configured to emit upon takeoff an electric wind in the direction of the acoustic waves so as to attenuate the acoustic waves and to be deactivated in a cruising rate of flight of the aircraft.

4. The aircraft according to claim 3, wherein the dielectric barrier discharge device comprises a first high tension electrode and a second electrode connected to ground, which are separated by a dielectric medium.

5. The aircraft according to claim 3, wherein the turbo engine comprises a primary ejection section and a secondary ejection section, and the dielectric barrier discharge device is axially positioned downstream from the secondary ejection section.

6. The aircraft according to claim 3, wherein the dielectric barrier discharge device comprises a pressure sensor which measures a flow pressure at a surface of the dielectric barrier discharge device, and the dielectric barrier discharge device is configured to regulate at least one characteristic of the electric wind based on the measured flow pressure.

7. A method of processing acoustic waves emitted at an outlet of a turbo engine of an aircraft, the aircraft including a dielectric barrier discharge device, the method comprising:
providing a cavity in a lower surface of a wing of the aircraft, the turbo engine being fastened to the wing;
providing the dielectric barrier discharge device in the cavity at the lower surface of the wing of the aircraft proximate to where the turbo engine is fastened, facing the turbo engine, the dielectric barrier discharge device being disposed higher than and downstream of an upstream portion of a support pylon which is fastened to the turbo engine, the support pylon connecting the turbo engine to the wing; and
activating the dielectric barrier discharge device upon takeoff to emit an electric wind in a direction of the acoustic waves so to attenuate the acoustic waves,
wherein the dielectric barrier discharge device is provided in the cavity at the lower surface of the wing of the aircraft such that an external surface of the dielectric barrier discharge device is continuous with an external surface of the wing of the aircraft.

8. An aircraft comprising:
a turbo engine which emits acoustic waves at an outlet thereof;
a wing;
a support pylon which connects the turbo engine to the wing, an upstream portion of the support pylon being fastened to the turbo engine; and
a dielectric barrier discharge device provided at a lower surface of the wing proximate to the lower surface to where the turbo engine is fastened, facing the turbo engine, so as to be disposed higher than and downstream of the upstream portion of the support pylon, the dielectric barrier discharge device configured to emit upon takeoff an electric wind in the direction of the acoustic waves so as to attenuate the acoustic waves,
wherein the dielectric barrier discharge device is provided in a cavity provided at the lower surface of the wing of the aircraft such that an external surface of the dielectric barrier discharge device is continuous with an external surface of the wing of the aircraft.

* * * * *